(12) United States Patent
Jung et al.

(10) Patent No.: US 11,196,909 B2
(45) Date of Patent: Dec. 7, 2021

(54) ELECTRONIC DEVICE AND METHOD FOR GENERATING CLOCK SIGNAL FOR IMAGE SENSOR IN CAMERA MODULE

(71) Applicant: SAMSUNG ELECTRONICS CO., LTD., Suwon-si (KR)

(72) Inventors: Hwa Joong Jung, Osan-si (KR); Man-Ho Kim, Suwon-si (KR); Tae-Yun Kim, Suwon-si (KR); Yonghwan Choi, Suwon-si (KR); Kihuk Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 105 days.

(21) Appl. No.: 16/193,220

(22) Filed: Nov. 16, 2018

(65) Prior Publication Data
US 2019/0158722 A1 May 23, 2019

(30) Foreign Application Priority Data
Nov. 17, 2017 (KR) .......................... 10-2017-0153917

(51) Int. Cl.
*H04N 5/225* (2006.01)
*H04N 5/232* (2006.01)
(Continued)

(52) U.S. Cl.
CPC ..... *H04N 5/23203* (2013.01); *H04N 5/23227* (2018.08); *H04N 5/23258* (2013.01);
(Continued)

(58) Field of Classification Search
None
See application file for complete search history.

(56) References Cited

U.S. PATENT DOCUMENTS

| 6,897,898 B1 | 5/2005 | Shinohara |
| 9,959,589 B2 | 5/2018 | Bae et al. |

(Continued)

FOREIGN PATENT DOCUMENTS

| EP | 2 506 564 | 10/2012 |
| KR | 10-2015-0042621 | 4/2015 |

(Continued)

OTHER PUBLICATIONS

Partial Search Report dated Apr. 18, 2019 in counterpart European Patent Application No. EP18206847.8.
(Continued)

*Primary Examiner* — Twyler L Haskins
*Assistant Examiner* — Dwight Alex C Tejano
(74) *Attorney, Agent, or Firm* — Nixon & Vanderhye P.C.

(57) ABSTRACT

Disclosed are an electronic device and a method for generating a clock signal within a camera module. The electronic device includes a processor, and a camera module, wherein the camera module may include a clock generation circuit configured to generate a second clock signal, the second clock signal being independent from a first clock signal, the first clock signal being generated by the processor, an optical correction circuit configured to be driven based on the second clock signal, and an image sensor configured to be driven while being synchronized with the optical correction circuit based on the second clock signal, wherein the processor may be configured to transfer a control command to the camera module, based on an input for driving the camera module and to acquire at least one image through the synchronized optical correction circuit and image sensor based on the second clock signal.

18 Claims, 9 Drawing Sheets

(51) Int. Cl.
    *H04N 5/376*      (2011.01)
    *H04N 5/357*      (2011.01)

(52) U.S. Cl.
    CPC ..... *H04N 5/23264* (2013.01); *H04N 5/23287* (2013.01); *H04N 5/3577* (2013.01); *H04N 5/3765* (2013.01)

(56) References Cited

U.S. PATENT DOCUMENTS

| | | | |
|---|---|---|---|
| 10,186,301 B1* | 1/2019 | van Hoff | H04N 5/232 |
| 2004/0169738 A1 | 9/2004 | Fujimoto | |
| 2005/0179782 A1* | 8/2005 | Endo | H04N 5/23203 |
| | | | 348/207.99 |
| 2006/0227437 A1* | 10/2006 | Makii | H04N 5/2254 |
| | | | 359/824 |
| 2008/0129848 A1 | 6/2008 | Yamauchi | |
| 2012/0287341 A1* | 11/2012 | Choi | H04N 5/262 |
| | | | 348/500 |
| 2015/0035967 A1* | 2/2015 | Wodnicki | H04N 5/23203 |
| | | | 348/82 |
| 2016/0241787 A1* | 8/2016 | Sekimoto | H04N 5/23212 |
| 2017/0048467 A1* | 2/2017 | Chuang | H04N 5/335 |
| 2017/0099449 A1* | 4/2017 | Kang | H04N 5/36961 |
| 2018/0061308 A1 | 3/2018 | Bae et al. | |

FOREIGN PATENT DOCUMENTS

| | | |
|---|---|---|
| KR | 10-2018-0024621 | 3/2018 |
| WO | 2015/076055 | 5/2015 |

OTHER PUBLICATIONS

Extended Search Report dated Aug. 9, 2019 in counterpart European Patent Application No. EP18206847.8.
European Office Action dated Jun. 9, 2020 for EP Application No. 18206847.8.

* cited by examiner

ELECTRONIC DEVICE AND METHOD FOR GENERATING CLOCK SIGNAL FOR IMAGE SENSOR IN CAMERA MODULE

CROSS-REFERENCE TO RELATED APPLICATION

This application is based on and claims priority under 35 U.S.C. § 119 to Korean Patent Application No. 10-2017-0153917, filed on Nov. 17, 2017, in the Korean Intellectual Property Office, the disclosure of which is incorporated by reference herein in its entirety.

BACKGROUND

1) Field

The present disclosure relates to an electronic device and a method for generating a clock signal for an image sensor in a camera module.

2) Description of Related Art

With the development of electronic devices, the electronic devices may acquire images. For example, the electronic device may include a camera module and acquire an image through the included camera module. For driving the camera module, the electronic device may use various signals. For example, the electronic device may use a signal for controlling the camera module and a clock signal for the operation of the camera module.

For the operation of a camera module, an electronic device may transmit a signal to a camera module from a processor. In this case, the signal transmitted from the processor to the camera module may cause interference to other elements of the electronic device related to a transmission path of the signal. The interference may cause a malfunction of the electronic device. Accordingly, a method of reducing the signal transmitted from the processor to the camera module may be required.

SUMMARY

Various embodiments of the present disclosure may provide an electronic device and a method for generating a clock signal within the camera module.

The present disclosure may not be limited to the above mentioned technical subjects, and other technical subjects which are not mentioned may be clearly understood, through the following descriptions, by those skilled in the art of the present disclosure.

In accordance with an aspect of the present disclosure, a camera module is provided. The camera module includes: a clock generation circuit; an optical correction circuit; and an image sensor, wherein the clock generation circuit is configured to generate a second clock signal, the second clock signal being distinguished from a first clock signal, the first clock signal being generated by an external processor of the camera module, and to provide the second clock signal to the optical correction circuit and the image sensor, the optical correction circuit is configured to be driven based on the second clock signal acquired from the clock generation circuit, and the image sensor is configured to be driven while being synchronized with the optical correction circuit, based on the second clock signal acquired from the clock generation circuit.

In accordance with another aspect of the present disclosure, an electronic device is provided. The electronic device includes: a processor; and a camera module, wherein the camera module comprises: a clock generation circuit configured to generate a second clock signal, the second clock signal being independent from a first clock signal, the first clock signal being generated by the processor, an optical correction circuit configured to be driven based on the second clock signal, and an image sensor configured to be driven while being synchronized with the optical correction circuit, based on the second clock signal, wherein the processor is configured to transfer a control command to the camera module, based on an input for driving the camera module and to acquire at least one image through the synchronized optical correction circuit and image sensor, based on the second clock signal generated by the clock generation circuit.

In accordance with another aspect of the present disclosure, an electronic device is provided. The electronic device includes: a camera module comprising an image sensor and a circuit related to acquisition of an image; and a processor, functionally connected to the camera module, wherein the processor is configured to transmit a first control signal to the circuit in response to detection of an event for driving a camera, wherein the circuit is configured to generate a clock signal based at least on the first control signal received from the processor, and to provide the generated clock signal to the image sensor, and the image sensor is configured to acquire data for generating an image, based on the clock signal in response to receiving a second control signal from the processor and to provide the acquired data to the processor.

An electronic device and a method thereof according to various embodiments can reduce interference generated due to signaling between a processor and a camera module and/or interference of an electromagnetic wave generated due to transmission of a clock signal between a processor and a camera module by generating a clock signal for the operation of an image sensor within the camera module.

Effects which can be acquired by the present disclosure are not limited to the above described effects, and other effects that have not been mentioned may be clearly understood by those skilled in the art from the following description.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
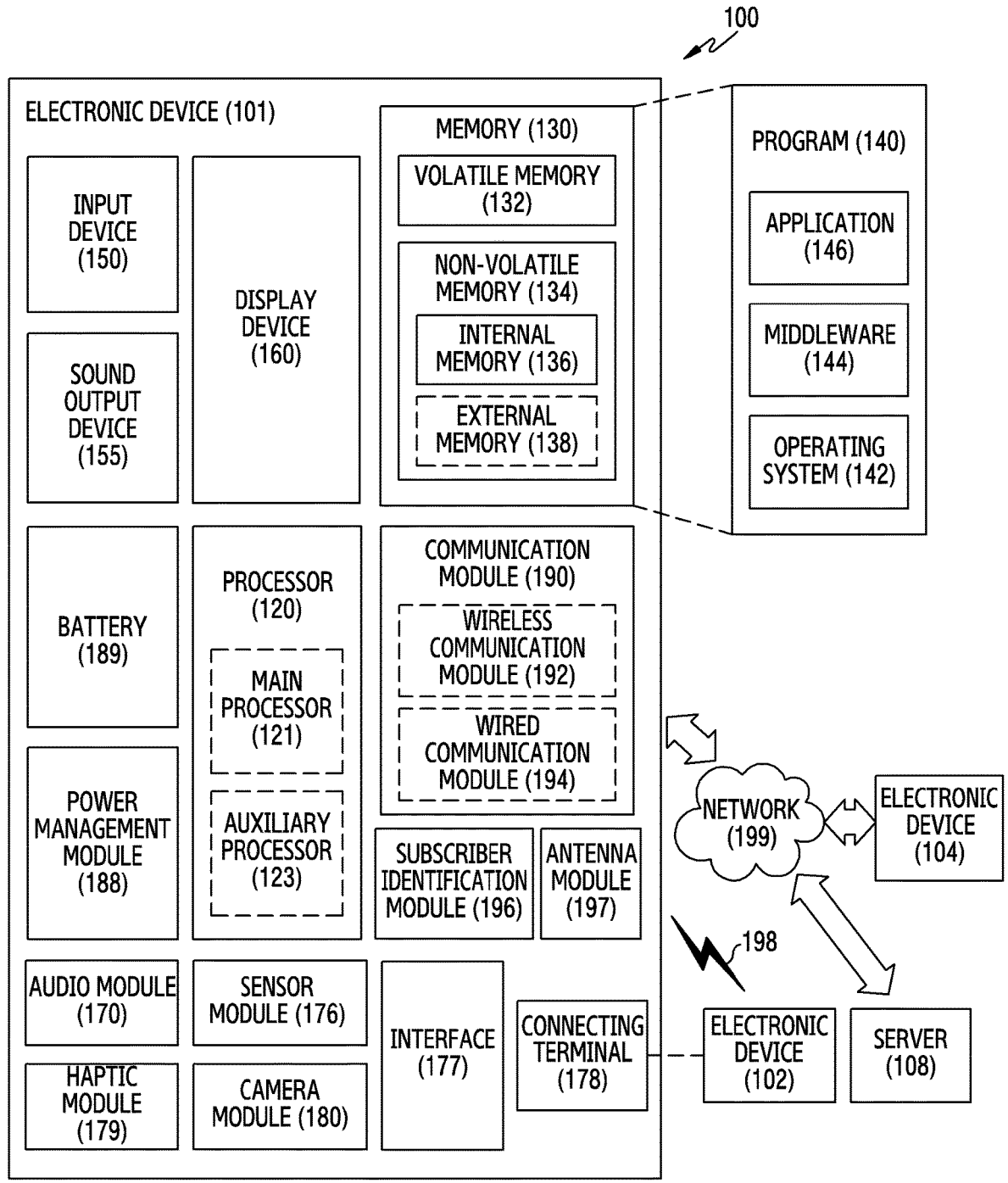
FIG. 1 is a block diagram illustrating an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
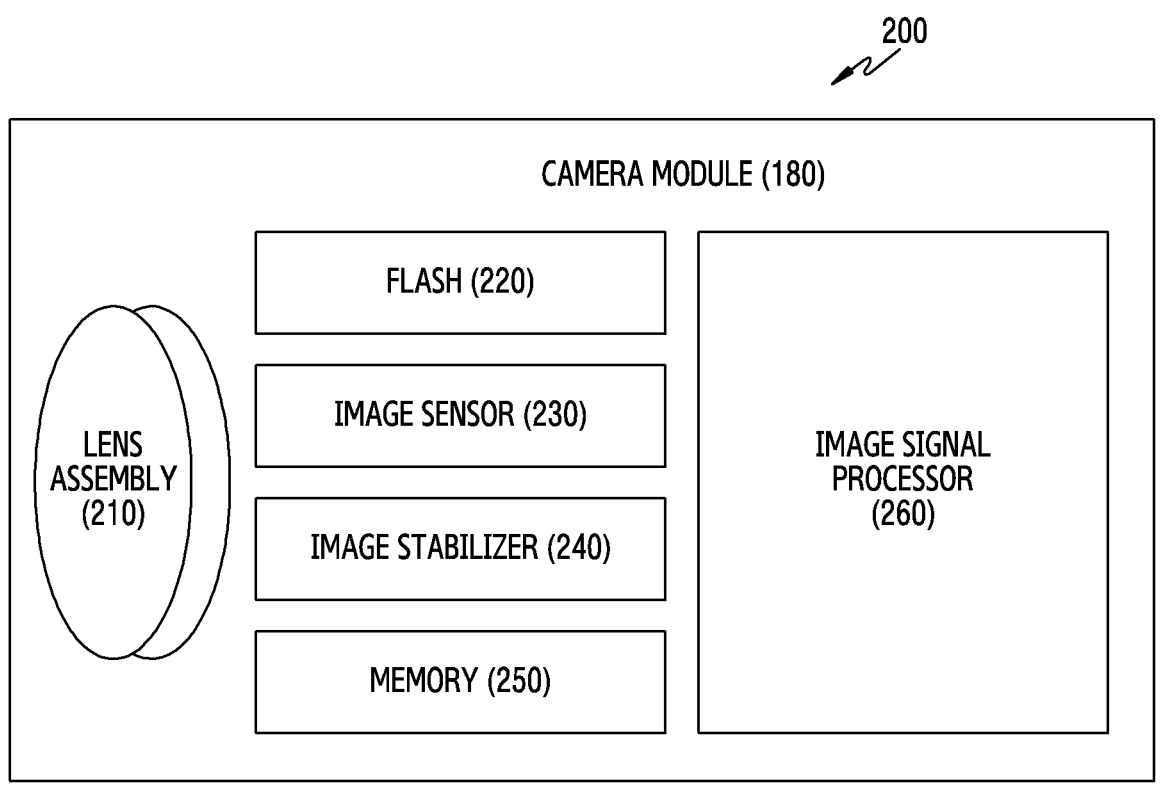
FIG. 2 is a block diagram illustrating a camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), and/or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, an ultraviolet (UV) LED), a xenon lamp, or the like. The image sensor 230 may obtain an image corresponding to an object by converting light emitted or reflected from the object and transmitted via the lens assembly 210 into an electrical signal. According to an embodiment, the image sensor 230 may include, for example, and without limitation, one selected from image sensors having different attributes, such as a RGB sensor, a black-and-white (BW) sensor, an IR sensor, a UV sensor, a plurality of image sensors having the same attribute, a plurality of image sensors having different attributes, or the like. Each image sensor included in the image sensor 230 may be implemented using, for example, and without limitation, a charged coupled device (CCD) sensor, a complementary metal oxide semiconductor (CMOS) sensor, or the like.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may include various processing circuitry and perform one or more image processing with respect to an image obtained via the image sensor 230 or an image stored in the memory 250. The one or more image processing may include, for example, and without limitation, depth map generation, three-dimensional (3D) modeling, panorama generation, feature point extraction, image synthesizing, image compensation (e.g., noise reduction, resolution adjustment, brightness adjustment, blurring, sharpening, or softening), or the like. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

An electronic device according to various embodiments disclosed herein may be various types of devices. The electronic device may, for example, and without limitation, include at least one of a portable communication device (e.g., smartphone) a computer device, a portable multimedia device, a portable medical device, a camera, a wearable device, a home appliance, or the like. The electronic device according to embodiments of the present disclosure is not limited to the above-described devices.

The term "module" or the ending of a word, such as "or", "er", or the like may refer, for example, to a unit of processing at least one function or operation, and this may be embodied by hardware, software, firmware or any combination thereof. These terms are illustrated for convenience of illustration. Accordingly, the present disclosure is not limited to the following terms and other terms having the same technical meaning may be used.

Figure 3:
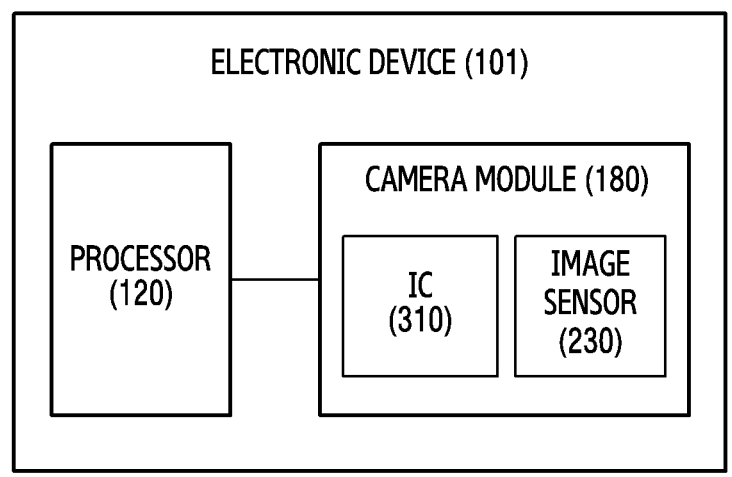
FIG. 3 is a block diagram illustrating an example of a functional configuration of the electronic device generating a clock signal within a camera module according to various embodiments.

FIG. 3 is a block diagram illustrating an example of a functional configuration of an electronic device generating a clock signal within a camera module according to various embodiments. The functional configuration may be included in the electronic device 101, illustrated in FIG. 1.

Referring to FIG. 3, the electronic device 101 may include the processor 120 and the camera module 180.

The processor 120 of the electronic device 101, illustrated in FIG. 3, may correspond to the processor 120 of the electronic device 101, illustrated in FIG. 1.

The camera module 180 of the electronic device 101, illustrated in FIG. 3, may correspond to the camera module 180 of the electronic device 101, illustrated in FIG. 1 or FIG. 2.

According to various embodiments, the processor 120 may include various processing circuitry and generate various signals or commands related to the operation of the camera module 180. The processor 120 may transmit a signal to the camera module 180 in response to detection of an input related to acquisition of an image. For example, the signal may include a signal (hereinafter, referred to as a clock request signal) for making a request for (or instructing) generation of a clock (or CLK) signal. The processor 120 may transmit the clock request signal to an IC 310 included in the camera module 180 and/or the image sensor 230 included in the camera module 180.

According to various embodiments, the processor 120 may transmit the clock request signal to the IC 310. The IC 310 may receive the clock request signal from the processor 120. The IC 310 may generate a clock signal to be provided to the image sensor 230 in response to the reception of the clock request signal. The IC 310 may transmit the clock signal to the image sensor 230. The clock signal may include a reference signal required for driving the image sensor 230.

According to various embodiments, the processor 120 may transmit the clock request signal through various types of ports. For example, the processor 120 may transmit the clock request signal to other elements (for example, the IC 310) within the electronic device 101 through an Inter Integrated Circuit (I2C) port (or an interface or a bus).

According to various embodiments, the processor 120 may itself generate another clock signal distinguished from the clock signal transmitted from the IC 310 to the image sensor 230. The clock signal generated by the processor 120, may be distinguished from the clock signal generated by the IC 310, which will be described below.

According to various embodiments, the other clock signal generated by the processor 120, may include a clock signal for driving the processor 120. According to some embodiments, the other clock signal may be used for the operation of elements, included in the electronic device 101 and may be distinguished from the clock signal generated in the camera module 180. In other words, the clock signal generated by the IC 310, may, for example, be used for elements such as the image sensor 230 within the camera module 180, and the other clock signal generated by the processor 120, may, for example, be used for elements (for example, the communication module 190, the audio module 170, the display device 160, and the input device 150) of the electronic device 101 other than the camera module 180.

According to various embodiments, since the clock signal generated by the IC 310, is used within the camera module 180, a length of the transmission path of the clock signal may be shorter than a length of a transmission path of the other clock signal, used between a particular element of the electronic device 101 and the processor 120. Since the clock signal is transmitted within a shorter distance than the other clock signal, a probability or likelihood of interference within the electronic device 101 by the clock signal may be lower than a probability or likelihood of generation of interference within the electronic device 101 by the other clock signal.

According to various embodiments, the transmission path (or a movement path) of the clock signal may be a length of a distance between the IC 310 and the image sensor 230. When the other clock signal generated through the processor 120, is applied to the image sensor 230, the length of the transmission path (or the movement path) of the other clock signal may be a length between the processor 120 and the image sensor 230. Since the transmission path of the clock signal is a path within the camera module 180, the length of the transmission path of the clock signal may be shorter than the length of the transmission path of the other clock signal, passing through other elements outside the camera module 180. In the case in which the clock signal is used for driving the image sensor 230, there is an effect of shortening the transmission path of the clock signal compared to the case in which the other clock signal is used.

According to various embodiments, when the length of the transmission path of the clock signal is long (for example, the length of the transmission path of the other clock signal), noise may be leaked through at least element (for example, a connector or a Flexible printed Circuit Board (FPCB)) of the electronic device 101, included in the transmission path. Due to leakage of noise, performance of an antenna of the electronic device 101 may deteriorate (or degraded). Elements causing noise may include, for example, and without limitation, a connector that breaking impedance matching and/or an FPCB including a flexible interval lacking shielding, or the like.

According to various embodiments, the electronic device 101 may reduce noise by shortening the transmission path of the clock signal, used by the electronic device 101. The electronic device 101 may prevent and/or reduce deterioration of the antenna performance by shortening the transmission path of the clock signal, used by the electronic device 101. The electronic device 101 may remove signal lines on a Printed Circuit Board (PCB) by shortening the transmission path of the clock signal, used by the electronic device 101. The electronic device 101 may remove the signal lines on the PCB by shortening the transmission path and thus mount a smaller PCB.

According to various embodiments, a degree of distortion of the clock signal may increase in proportion to the length of the transmission path of the clock signal. Based on the shortening of the transmission path of the clock signal, a clock signal, which is minimally distorted (and/or having a reduced distortion), may be generated. The image sensor 230 may acquire image data in a state in which an error is minimized and/or reduced, that is, a high-quality state, based on the clock signal, which is minimally distorted.

According to various embodiments, the processor 120 may transmit a camera driving signal for driving a camera to the image sensor 230. The processor 120 may acquire image data from the image sensor 230 by transmitting the camera driving signal to the image sensor 230 in a state in which the clock signal is applied to the image sensor 230. The image data may include data, included in the image sensor 230 or processed by the image signal processor 260 included in the camera module 180. For example, the image data may include data generated by processing data on an intensity of light acquired by the image sensor 230, based on information related to an image.

According to various embodiments, when the image signal processor 260 is included in the processor 120, the processor 120 may receive data on the intensity of light from the image sensor 230 based on transmission of the camera driving signal to the image sensor 230. The data on the intensity of light may be digital data converted from analog data on the intensity of light through the image sensor 230. In this case, the processor 120 may acquire information related to an image from at least one element (for example, the image stabilizer 240 of FIG. 2), included in the camera module 180, simultaneously with, sequentially with, or regardless of reception of the data on the intensity of light. The information related to the image may include, for example, information related to movement of the electronic device 101. The processor 120 may generate image data by receiving the data on the intensity of light and the information related to the image.

According to various embodiments, the processor 120 may transmit the camera driving signal to other elements within the electronic device 101 through an Inter Integrated Circuit (I2C) port (or an interface or a bus). The I2C port may be one of the ports for transmitting a signal from the processor 120 to other elements, included in the electronic device 101. The elements for transmitting the signal may include various ports and are not limited thereto.

According to various embodiments, the IC 310 may be a functional element including various circuits related to driving of the camera module 180. The IC 310 may, for example, and without limitation, include an element including a clock generation circuit, an element including a temperature compensation circuit, or the like. For example, the IC 310 may include the image stabilizer 240 for correcting movement of the electronic device 101 by shaking of user's hands or a gyro sensor (or a gyro circuit). According to some embodiments, the image stabilizer 240 may include an Optical Image Stabilizer (OIS) (hereinafter, referred to as an OIS). The OIS may include a circuit (hereinafter, referred to as a clock generation circuit) for generating a clock signal and may generate the clock signal through the clock generation circuit. According to other embodiments, the gyro sensor may include a temperature compensation circuit (for example, a temperature sensor). The gyro sensor may detect temperature related to the IC 310 or the camera module 180 (or temperature related to the clock signal) through the temperature sensor. The IC 310 may include various elements including the clock generation circuit or the temperature compensation circuit, but is not limited thereto.

According to various embodiments, the IC 310 may generate a clock signal (for example, a Master Clock (MCLK)) in response to reception of the clock request signal from the processor 120. The IC 310 may generate the clock signal through the clock generation circuit, included in the IC 310. The clock generation circuit may include, for example, the clock generation circuit (or the clock generation module), included in the optical image stabilizer.

According to various embodiments, the IC 310 may transmit the generated clock signal to the image sensor 230. The IC 310 may include a port for transmitting a signal. The IC 310 may transmit the clock signal generated within the IC 310 for driving the image sensor 230, to the image sensor 230 through the port. The port may include various elements for transmitting the signal generated by the IC 310 to the outside of the IC 310 but is not limited thereto.

According to various embodiments, the IC 310 may include the temperature sensor (or the temperature compensation circuit) for compensating for temperature. The IC 310 may include a temperature compensation circuit to improve a quality of the clock signal. According to some embodiments, the temperature compensation circuit may be distinguished from the clock generation circuit. For example, the element (for example, the gyro sensor) of the IC 310 including the temperature compensation circuit may be distinguished from the element (for example, the image stabilizer 240) of the IC 310 including the clock generation circuit. The temperature compensation circuit may correct and/or reduce distortion of the clock signal generated due to temperature rise by detecting temperature of the camera module 180 (or temperature related to the clock signal). According to an embodiment, in order to correct and/or reduce distortion of the clock signal, the camera module 180 may include the temperature compensation circuit. The temperature may be compensated for through the temperature compensation circuit. Through the compensation for temperature, the distorted clock signal may be converted to a more stable clock signal. Through the conversion of the clock signal due to the compensation for temperature, the quality of the clock signal may be improved. The stable clock signal may include, for example, a signal for constantly maintaining a fixed frequency without frequency drift.

According to various embodiments, the image sensor 230 may include the temperature compensation circuit. The image sensor 230 may acquire information on temperature through the temperature compensation circuit. The image sensor 230 may perform various operations for compensating for the changed temperature through the temperature compensation circuit. For example, the image sensor 230 may acquire information on temperature of the camera module 180 through the temperature compensation circuit. The image sensor 230 may identify temperature of the camera module 180 (or temperature related to the clock signal) and determine whether temperature compensation is needed. For example, when temperature of the camera module 180 is higher than or equal to predetermined temperature, the image sensor 230 may determine that temperature compensation is needed. The image sensor 230 may generate data related to the temperature compensation by detecting temperature through the temperature sensor. The data related to the temperature compensation may include data related to a change in temperature or information on a compensation value for compensating for temperature. The compensation value may include, for example, a compensation voltage, generated for compensation. The image sensor 230 may generate the compensation value based on information on the compensation value. The image sensor 230 may transmit the generated compensation value to the clock generation signal. The clock generation signal may be corrected by the transmitted compensation value.

According to various embodiments, the operation related to temperature compensation may be performed by the image signal processor 260 itself or by an element (for example, the camera module 180 or the processor 120) including the image signal processor 260. According to some embodiments, the image sensor 230 may include the image signal processor 260. The image signal processor 260 may perform the operation for temperature compensation using the temperature compensation circuit. According to other embodiments, the image signal processor 260 may be located outside the image sensor 230. For example, the image signal processor 260 may be included in the camera module 180 to be distinguished (or independent) from the image sensor 230. According to other embodiments, the image signal processor 260 may be located outside the camera module 180. For example, the image signal processor 260 may be included in the processor 120. The image signal processor 260 may control the operation related to the temperature compensation through the temperature compensation circuit regardless of the location of the image signal processor 260. The operation related to the temperature compensation may include an operation of detecting temperature of the camera module 180 through the temperature compensation circuit and identifying the temperature. In another example, the operation related to the temperature compensation may include an operation of generating a compensation value (for example, a compensation voltage) for compensating for the temperature through the temperature compensation circuit.

According to various embodiments, the image sensor 230 may be configured to be driven based on the received clock signal. The image sensor 230 may generate at least one frequency for driving the image sensor 230 by receiving the clock signal from the IC 310. For example, at least one frequency may include a frequency for determining a start point of the operation (for example, the operation of detecting light) of the image sensor 230, a frequency for synchronization with other elements, or a frequency for the operation of the image sensor 230.

According to various embodiments, the image sensor 230 may generate image data in a state in which the clock signal is received in response to reception of the camera driving signal from the processor 120. The image sensor 230 may generate image data in response to reception of the camera driving signal. The image data may be data, generated based on information on the intensity of light acquired through the image sensor 230, and information related to the image acquired by other elements of the camera module 180.

According to various embodiments, the operation of the image sensor 230 may vary depending on whether the image signal processor 260 is included in the image sensor 230. According to some embodiments, the image sensor 230 may include an Image Signal Processor (ISP) 260. In this case, the image sensor 230 may generate image data in response to detection of light. According to other embodiments, the image sensor 230 may be configured to be independent from the image signal processor 260. For example, the image signal processor 260 may be located outside the image sensor 230. In this case, the image sensor 230 may perform the operation of converting analog data into digital data. For example, the image sensor 230 may generate raw data indicating the intensity of light by detecting the light. The raw data may be transmitted to the image signal processor 260 and converted into image data.

The camera module according to various embodiments may include a clock generation circuit, an optical correction circuit, and/or an image sensor, the clock generation circuit may be configured to generate a second clock signal distinguished from a first clock signal generated by a processor outside the camera module, and provide the second clock signal to the optical correction circuit and the image sensor, the optical correction circuit may be configured to be driven based on the second clock signal acquired from the clock generation circuit, and the image sensor may be configured to be driven in a state in which the image sensor is synchronized with the optical correction circuit based on the second clock signal acquired from the clock generation circuit.

According to various embodiments, the clock generation circuit may be included in the optical correction circuit. According to some embodiments, the camera module may further include a temperature sensor, and the second clock signal may be corrected based on the temperature detected through the temperature sensor. According to other embodiments, the camera module may further include a gyro circuit (or a gyro sensor), and the gyro circuit may be configured to be driven while being synchronized with the optical correction circuit and the image sensor based on the second clock signal.

The electronic device 101 according to various embodiments may include the processor 120 and the camera module 180. The camera module 180 may include the clock generation circuit configured to generate the second clock signal independent from the first clock signal generated by the processor 120, the optical correction circuit configured to be driven based on the second clock signal, and the image sensor 230 configured to be driven while being synchronized with the optical correction circuit based on the second clock signal. The processor 120 may be configured to transfer a control command to the camera module 180 based on an input for driving the camera module 180 and acquire at least one image through the optical correction circuit and the image sensor 230 synchronized based on the second clock signal generated by the clock generation circuit.

According to various embodiments, the clock generation circuit of the electronic device 101 may be included in the optical correction circuit. The electronic device 101 may further include a temperature sensor and the second clock signal may be configured to be corrected based on temperature detected through the temperature sensor.

According to various embodiments, the electronic device 101 may further include a gyro circuit. The gyro circuit may be configured to be driven while being synchronized with the optical correction circuit and the image sensor 230 based on the second clock signal.

The electronic device 101 according to various embodiments may include the image sensor 230, the camera module 180 including a circuit (for example, the IC 310) related to acquisition of an image, and the processor 120 functionally connected to the camera module 180. The processor 120 may be configured to transmit a first control signal to the circuit related to the acquisition of the image in response to detection of an event for driving the camera module 180. The circuit related to the acquisition of the image may be configured to generate a clock signal based at least on the first control signal received from the processor 120, and provide the generated clock signal to the image sensor 230. The image sensor 230 may be configured to acquire data for generating an image based on the clock signal in response to reception of a second control signal from the processor 120 and provide the acquired data to the processor 120.

According to various embodiments, the electronic device 101 may be configured to operate based on another clock signal distinguished from the clock signal. The first control signal may be used for making a request for generating the clock signal. The second control signal may be used for making a request for acquiring the data to the image sensor. According to embodiments, the first control signal or the second control signal may be transmitted from the processor 120 to the camera module through an Inter Integrated Circuit (I2C) port.

According to various embodiments, the electronic device 101 may use the clock signal for synchronizing the operation of the circuit related to acquisition of the image included in the camera module 180 and the operation of the image sensor 230 included in the camera module 180. The circuit related to acquisition of the image may include a circuit for compensating for a value by movement of the electronic device on the data for generating the image. The included circuit may be, for example, an optical correction circuit.

According to various embodiments, the image sensor 230 may include a circuit (for example, a temperature compensation circuit) for compensating for temperature, and the circuit for compensating for temperature may be configured to acquire information on temperature of the camera module 180 and generate data related to the temperature of the camera module 180 based on the acquired information.

According to various embodiments, the processor 120 may be configured to determine whether the temperature of the camera module 180 is higher than or equal to predetermined temperature based on the acquire information, generate data for compensating for the temperature of the camera module 180 when the temperature of the camera module 180 is higher than or equal to the predetermined temperature, and correct the clock signal through the circuit related to the acquisition of the image based on the generated data.

According to various embodiments, the circuit related to acquisition of the image may further include a gyro circuit (or a gyro sensor) including the circuit (for example, the temperature compensation circuit) for compensating for temperature. The processor 120 may be configured to acquire information on the temperature of the camera module 180 through the gyro circuit. According to embodiments, the processor 120 may be configured to determine whether the temperature of the camera module 180 is higher than or equal to predetermined temperature based on the acquired information, generate data for compensating for the temperature of the camera module 180 when the temperature of the camera module 180 is higher than or equal to the predetermined temperature, and correct the clock signal through the circuit related to acquisition of the image based on the generated data.

Figure 4:
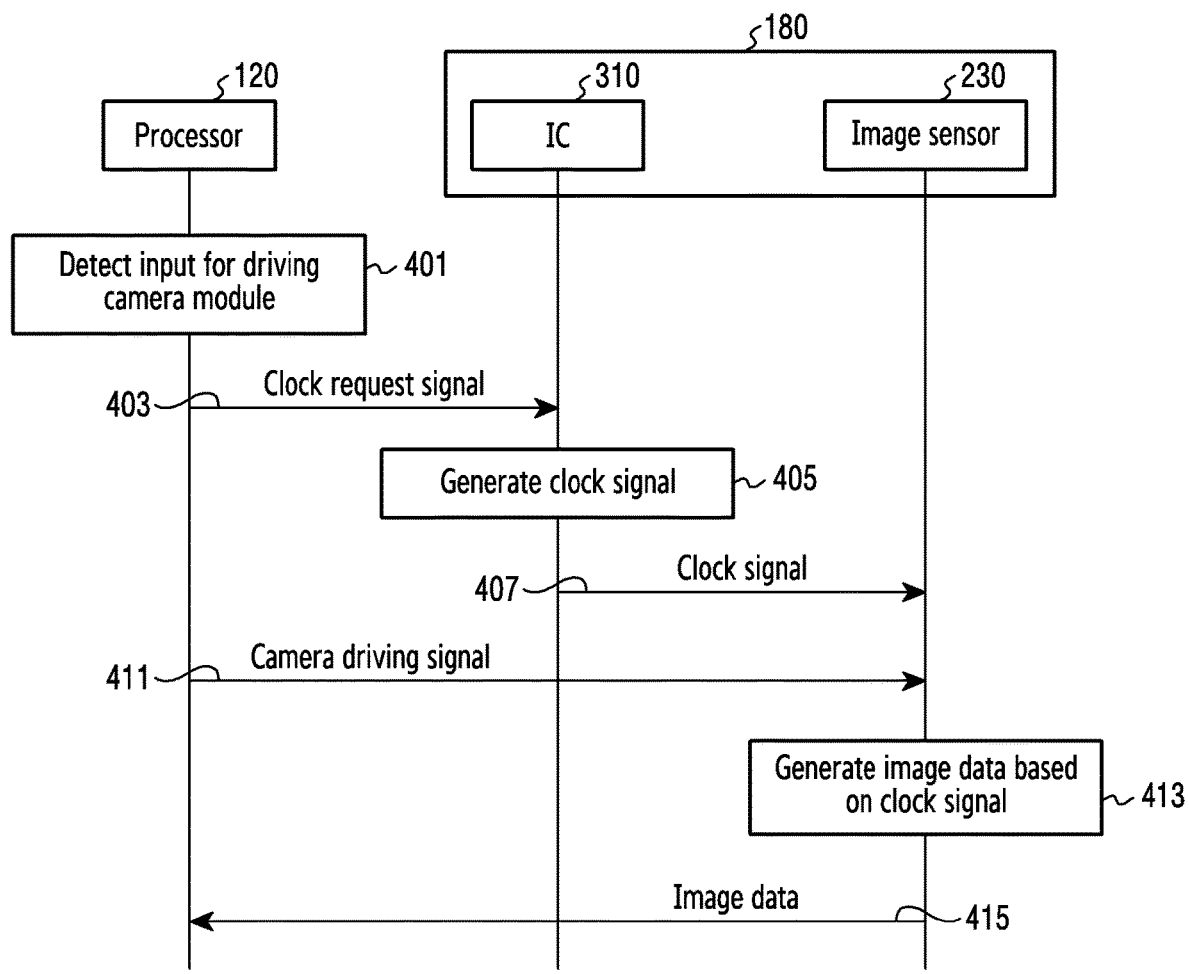
FIG. 4 is a signal flow diagram illustrating an example of a signal flow of the electronic device generating the clock signal within the camera module according to various embodiments.

FIG. 4 is a signal flow diagram illustrating an example of a signal flow of the electronic device generating the clock signal within the camera module according to various embodiments. Referring to FIG. 4, the electronic device 101 may include the processor 120 and/or the camera module 180. The camera module 180 may include the IC 310 and/or the image sensor 230.

In operation 401, the processor 120 may detect an input for driving the camera module 180. For example, the processor 120 may detect a user input for executing a camera application. The user input may include, for example, tap, double tap, long process, or drag and drop. In another example, the processor 120 may receive a signal for triggering the operation of the camera module 180 from another electronic device.

In operation 403, the processor 120 may transmit a clock request signal to the IC 310. The processor 120 may transmit a signal (hereinafter, the clock request signal) for making a request for generating the clock signal within the IC 310 to the IC 310 based on detection of the input. The IC 310 may receive the clock request signal according to the transmission.

In operation 405, the IC 310 may generate the clock signal. The IC 310 may include a circuit (hereinafter, referred to as a clock generation circuit) for generating the clock signal. The IC 310 may generate the clock signal through the clock generation circuit in response to reception of the clock request signal. The IC 310 may include, for example, the image stabilizer 240 or a clock generation module, included in the image stabilizer 240. The IC 310 may include various circuits for generating the clock signal within the camera module 180 but is not limited thereto. According to some embodiments, the clock signal may include a reference signal (for example, a master clock signal) for driving the camera module 180 or the image sensor 230. According to other embodiments, the clock signal may include a signal for synchronization between elements within the camera module 180 or between elements related to the camera module 180 within the electronic device 101.

In operation 407, the IC 310 may transmit the clock signal to the image sensor 230. The image sensor 230 may enter a state capable of acquiring an image in response to transmission of the clock signal to the image sensor 230. For example, the image sensor 230 may generate frequencies required for driving the image sensor 230. In another example, the image sensor 230 may perform a control to match an operation time point thereof with that of another element (for example, the IC) within the electronic device 101 (for example, a time point at which the signal is transmitted/received). In another example, the image sensor 230 may perform a control to match the operation time point thereof with that of elements within the camera module 180.

According to various embodiments, the IC 310 may include at least one port (or interface, bus, or signal line) for transmitting the clock signal. The IC 310 may transmit the clock signal to the image sensor 230 through various types of ports for transmitting the clock signal.

In operation 411, the processor 120 may transmit a camera driving signal for driving the camera module 180 to the image sensor 230. The processor 120 may transmit the camera driving signal to acquire an image through the operation of the camera module 180.

In operation 413, the image sensor 230 may generate image data based on the clock signal. When receiving the camera driving signal from the processor 120, the image sensor 230 may generate image data based on the clock signal. For example, the image sensor 230 may detect light at a particular time point indicated by the clock signal or generate data indicating an intensity of light. In another example, the image sensor 230 may detect light based on a frequency signal caused by the clock signal or generate data on the intensity of light. The image sensor 230 may detect light to generate image data and generate data on the intensity of light.

Although not illustrated, according to various embodiments, the image sensor 230 may generate image data based on information related to the image data, generated by the IC 310. The information related to the image data may include, for example, information on a compensation value for compensating for an influence (for example, image shaking) on a photographed image by movement of the electronic device 101. According to some embodiments, the information related to the image data may be generated by the IC 310 in response to detection of the input for driving the camera module. In this case, the operation of generating the information for image data within the IC 310 may be performed simultaneously with operation 405 or regardless of the order thereof. According to other embodiments, the IC 310 may generate information related to the image data in response to transmission of the camera driving signal to the image sensor 230. The processor 120 may transmit information on the camera driving signal to the IC 310. The IC 310 may generate information related to the image data in response to transmission of the information on the camera driving signal. The IC 310 may transmit the information related to the image data to the image sensor 230.

Although not illustrated, according to various embodiments, the image signal processor 260 may be located outside the image sensor 230. For example, the image signal processor 260 may be located inside the camera module 180 independently from the image sensor 230. In another example, the image signal processor 260 may be included in the processor 120. The image sensor 230 may detect light and convert information on the light from an analog signal into a digital signal. The image signal processor 260 may generate image data based on the converted digital signal. For example, the image signal processor 260 may generate image data by applying information on an image (for example, information on shaking or noise information), generated by measuring the converted digital signal by the IC 310.

In operation 415, the image sensor 230 may transmit the generated image data to the processor 120. The image sensor 230 may process the data on the intensity of the light acquired by detecting the light, and generate image data. For example, the image sensor 230 may process data on the intensity of the light by adjusting a resolution, reducing noise, generating a depth map, or extracting feature points and generate image data. According to an embodiment, the image sensor 230 may include the image signal processor 260 and may perform the processing based on the image signal processor 260.

Although not illustrated, according to various embodiments, when the image signal processor 260 is not included in the image sensor 230, the image sensor 230 may transmit data on the intensity of the light to the image signal processor 260 in response to reception of the camera driving signal. The transmitted data may be processed through the image signal processor 260 and converted into image data. The image data may be transmitted from the image signal processor 260 to the processor 120.

According to various embodiments, the image signal processor 260 may be included in the processor 120. In this case, the image sensor 230 may transmit the data on the intensity of the light to the processor 120 in response to reception of the camera driving signal. The processor 120 may convert the data on the intensity of the light to image data through the image signal processor 260.

Figure 5:
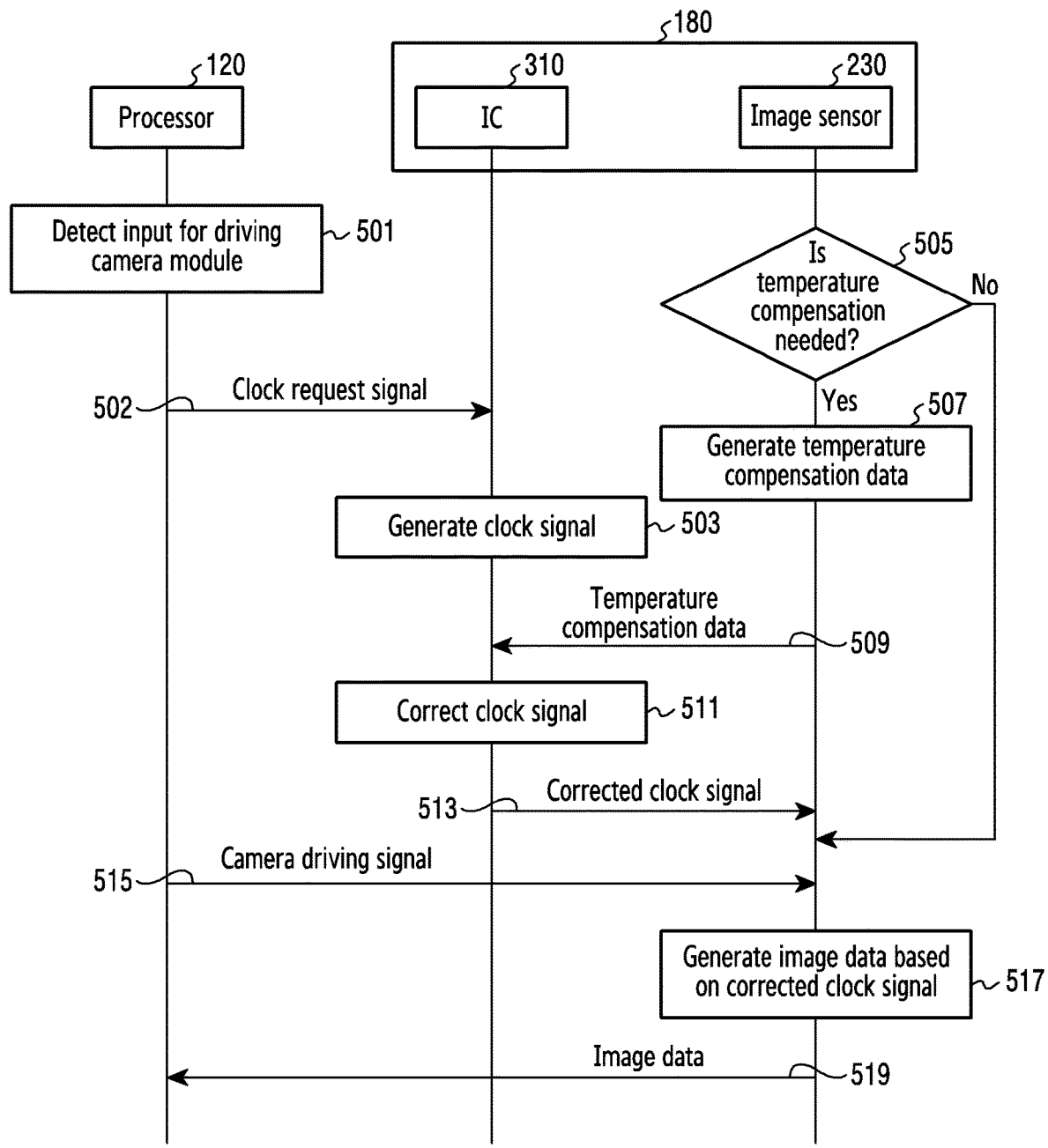
FIG. 5 is a signal flow diagram illustrating an example of a signal flow within the electronic device related to temperature compensation according to various embodiments.

FIG. 5 is a signal flow diagram illustrating another example of the signal flow within the electronic device related to temperature compensation according to various embodiments. Referring to FIG. 5, the electronic device 101 may include the processor 120 and/or the camera module 180. The camera module 180 may include the IC 310 and/or the image sensor 230.

In operation 501, the processor 120 may detect an input for driving the camera module. Operation 501 may correspond to operation 401 of FIG. 4 and a description overlapping that of operation 401 may not be repeated here.

In operation 502, the processor 120 may transmit a clock request signal to the IC 310. Operation 502 may correspond to operation 403 of FIG. 4 and a description overlapping that of operation 403 may not be repeated here.

In operation 503, the IC 310 may generate the clock signal. The generated clock signal may be unstable. According to various embodiments, in a process of generating the clock signal, temperature of the IC 310, the camera module 180 including the IC 310, or the electronic device 101 may rise. In this case, due to the temperature rise, the generated clock signal may be distorted or unstable.

In operation 505, the image sensor 230 may determine whether temperature compensation is needed. The temperature compensation may include an operation for controlling frequency disturbance caused by a temperature change. According to various embodiments, the image sensor 230 may include a temperature compensation circuit. The image sensor 230 may acquire information on temperature of the camera module 180 (or temperature related to the clock signal) through the temperature compensation circuit. The image sensor 230 may determine whether the temperature compensation is needed based on the acquired information. For example, when the temperature detected through the temperature compensation circuit is higher than or equal to predetermined temperature, the image sensor 230 may determine that the temperature compensation is needed.

Although not illustrated, according to various embodiments, operation 505 may be performed by the image signal processor 260 (or the processor 120). The image signal processor 260 (or the processor 120) may determine whether the temperature compensation is needed by detecting temperature through the temperature compensation circuit. According to some embodiments, the temperature compensation circuit may be included in the image sensor 230. The image signal processor 260 (or the processor 120) may determine whether the temperature compensation is needed by detecting temperature through the temperature compensation circuit within the image sensor 230. In other embodiments, the temperature compensation circuit may be included in the IC. The image signal processor 260 (or the processor 120) may determine whether the temperature compensation is needed by detecting temperature through the temperature compensation circuit within the IC.

According to various embodiments, operation 507 may be performed when the image sensor 230 determines that the temperature compensation is needed. Operation 517 may be performed when the image sensor 230 determines that the temperature compensation is not needed.

In operation 507, the image sensor 230 may generate temperature compensation data. The image sensor 230 may acquire various pieces of information related to temperature through the temperature compensation circuit included in the image sensor 230. The image sensor 230 may generate temperature compensation data based on the acquired information through the temperature compensation circuit. The image sensor 230 may generate temperature compensation data through the temperature compensation circuit included in the image sensor 230. The temperature compensation data may include various pieces of data for compensating for values, influenced by the changed temperature. For example, the temperature compensation data may include information for compensating for the clock signal, information for stabilizing the clock signal, or information on temperature.

Although not illustrated, according to various embodiments, operation 507 may be performed by the image signal processor 260 (or the processor 120). The image signal processor 260 (or the processor 120) may acquire various pieces of information through the temperature compensation circuit. The image signal processor 260 (or the processor 120) may generate temperature compensation data based on the acquired information through the temperature compensation circuit.

According to various embodiments, the temperature compensation circuit may be located within an element of the camera module 180 and thus included in the camera module 180. For example, the temperature compensation circuit may be located within the image sensor 230 and thus included in the camera module 180. In another example, the temperature compensation circuit may be located within the IC 310 (for example, a gyro sensor) and thus included in the camera module 180.

In operation 509, the image sensor 230 may transmit the generated temperature compensation data to the IC 310. The image sensor 230 may transmit the generated temperature compensation data to the clock generation circuit, included in the IC 310, in order to compensate for temperature.

Although not illustrated, according to various embodiments, operation 509 may be performed by the image signal processor 260 (or the processor 120). The image signal processor 260 (or the processor 120) may transmit the temperature compensation data to the IC 310. The mage signal processor 260 (or the processor 120) may transmit the temperature compensation data to the clock generation circuit included in the IC 310.

In operation 511, the IC 310 may correct the generated clock signal based on the received temperature compensation data. The IC 310 may correct the distorted clock signal into the stable clock signal in real time in response to reception of the temperature compensation data. The distorted clock signal may be, for example, an irregular signal rather than a signal periodically indicating 0 and 1. The corrected clock signal may be a precise quality signal or a high quality signal.

In operation 513, the IC 310 may transmit the corrected clock signal to the image sensor 230. The IC 310 may transmit the corrected clock signal to the image sensor 230 in order to drive the image sensor 230.

In operation 515, the processor 120 may transmit a camera driving signal for driving the camera module 180 to the image sensor 230. The processor 120 may transmit the camera driving signal to acquire an image through the operation of the camera module 180. Operation 517 may correspond to operation 411 of FIG. 4.

In operation 517, the image sensor 230 may generate image data based on the corrected clock signal. When receiving the camera driving signal from the processor 120, the image sensor 230 may generate image data based on the corrected clock signal. For example, the image sensor 230 may detect light at a particular time point indicated by the corrected clock signal and generate data indicating intensity of light. In another example, the image sensor 230 may detect light based on a frequency signal caused by the corrected clock signal or generate data on the intensity of light. The image sensor 230 may detect light to generate image data and generate data on the intensity of light. According to various embodiments, operation 517 may correspond to operation 413 of FIG. 4. A description overlapping that of operation 413 may be omitted.

In operation 519, the image sensor 230 may transmit image data to the processor 120. The image sensor 230 may process the data on the intensity of the light acquired by detecting the light, and generate image data. For example, the image sensor 230 may process data on the intensity of the light by adjusting a resolution, reducing noise, generating a depth map, or extracting feature points and generate image data. Operation 519 may correspond to operation 415 of FIG. 4 and a description overlapping that of operation 415 may be omitted.

Figure 6:
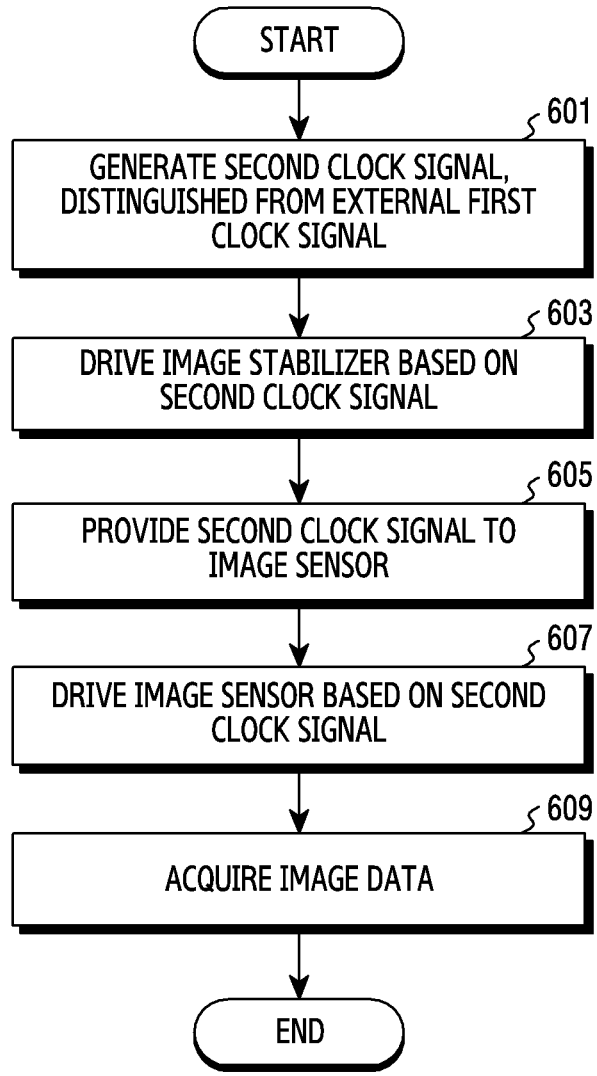
FIG. 6 is a flowchart illustrating an example of the operation of the camera module generating the clock signal according to various embodiments.

FIG. 6 is a flowchart illustrating an example of the operation of the camera module generating the clock signal according to various embodiments. The camera module 180 may include the IC 310 and/or the image sensor 230.

Referring to FIG. 6, in operation 601, the IC 310 included in the camera module 180 may generate a second clock signal distinguished from an external first clock signal. The IC 310 may include the image stabilizer 240 (or an optical correction circuit) and/or a gyro sensor. According to an embodiment, the second clock signal may be generated through a clock generation circuit included in the image stabilizer 240.

According to various embodiments, the external first clock signal may include a clock signal generated by the processor 120. The second clock signal may include the clock signal generated by the camera module 180 or an element (for example, the IC 310), included in the camera module 180.

In operation 603, the camera module 180 may drive the image stabilizer 240 based on the second clock signal. According to various embodiments, the camera module 180 may control driving of the image stabilizer 240 by providing a signal to a module (for example, a Phase Lock Loop (PLL) module) related to driving of the image stabilizer 240 in response to generation of the second clock signal through the clock generation circuit of the image stabilizer 240.

In operation 605, the IC 310, included in the camera module 180, may provide the second clock signal to the image sensor 230. The second clock signal may include a signal required for driving the image sensor 230.

According to various embodiments, the IC 310 may include an output port for outputting the generated clock. The clock generated within the IC 310 may be provided from the IC 310 to the image sensor 230 through the output port. Operations 603 and 605 may be performed simultaneously or regardless of order thereof.

In operation 607, the camera module 180 may drive the image sensor 230 based on the second clock signal. According to various embodiments, the image sensor 230 may be driven in response to application of the second clock signal to a module (for example, the PLL module) for driving within the image sensor 230. The camera module 180 may detect light through the image sensor 230 and acquire data on an intensity of the light.

In operation 609, the camera module 180 may acquire (generate) image data. According to various embodiments, the camera module 180 may acquire image data based on data on the acquired intensity of light in response to driving of the image sensor 230. The camera module 180 may acquire data on the intensity of light through the image sensor 230 and acquire image data by processing the acquired data. For example, the camera module 180 may acquire image data by adjusting a resolution for the data on the intensity of light, reducing noise, generating a depth map, or extracting feature points. According to embodiments, the camera module 180 may perform processing for acquiring image data through the image signal processor 260.

Figure 7:
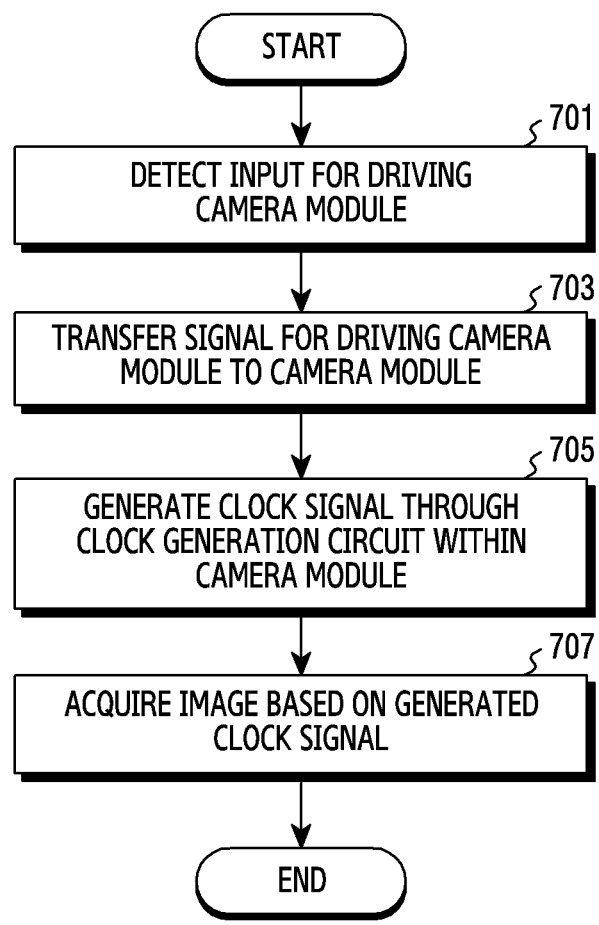
FIG. 7 is a flowchart illustrating an example of the operation of the electronic device generating the clock signal within the camera module according to various embodiments.

FIG. 7 is a flowchart illustrating an example of the operation of the electronic device generating the clock signal within the camera module according to various embodiments. According to various embodiments, the electronic device 101 may include the processor 120.

Referring to FIG. 7, in operation 701, the processor 120 may detect an input for driving the camera module 180. The input for driving the camera module 180 may include, for example, a user input for executing a camera application.

In operation 703, the processor 120 may transfer a signal (for example, a clock request signal) for making a request for (or causing) generation of the clock to the camera module 180. The processor 120 may transmit the clock request signal to the camera module 180 or the IC 310 included in the camera module 180 in response to reception of the input for driving the camera module 180.

In operation 705, the IC 310 may generate the clock signal in response to transmission of the clock request signal. According to various embodiments, the IC 310 of the camera module 180 may generate the clock signal through the clock generation circuit. The clock signal may include a reference signal for the operation of an element of the camera module 180 including the clock generation circuit or a particular element (for example, the image sensor 230) included in the camera module 180. According to an embodiment, the IC 310 may include the image stabilizer 240 and the clock generation circuit may be included in the image stabilizer 240. The clock generation circuit may be included in the camera module 180 as an element distinguished from the image sensor 230, and is not limited to the above example.

Although not illustrated, according to various embodiments, the processor 120 may detect temperature through the temperature compensation circuit included in the IC 310 and acquire information on the temperature. According to an embodiment, the temperature compensation circuit may be included in a gyro sensor, included in the IC 310. The temperature compensation circuit may be included in at least one of various elements of the camera module 180 and is not limited to above example.

In operation 707, the processor 120 may acquire an image based on the generated clock signal. The processor 120 may acquire an image through the IC 310 and/or the image sensor 230 based on the generated clock signal. According to various embodiments, the IC 310 and/or the image sensor 230 may be driven based on the generated clock signal. The IC 310 may acquire information relate to the image data. For example, the IC 310 may acquire information for correcting shaking of the electronic device 101 by measuring movement of the electronic device 101 through the gyro sensor and the image stabilizer 240.

Figure 8:
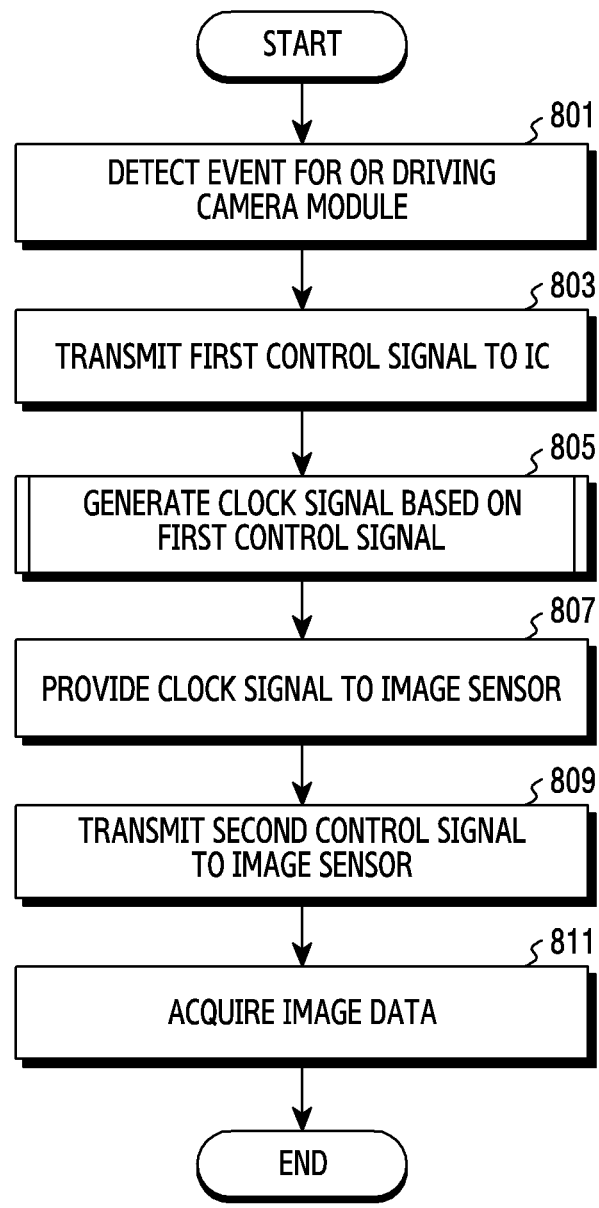
FIG. 8 is a flowchart illustrating another example of the operation of the electronic device generating the clock signal within the camera module according to various embodiments.

FIG. 8 is a flowchart illustrating another example of the operation of the electronic device generating the clock signal within the camera module according to various embodiments.

Referring to FIG. 8, in operation 801, the processor 120 may detect an event for driving the camera module 180. The event for driving the camera module 180 may include detection of a user input for executing, for example, a camera application. In another example, the event for driving the camera module 180 may include reception of a signal causing execution of the camera module 180 from another electronic device.

In operation 803, the processor 120 may transmit a first control signal to the IC 310. The processor 120 may transmit the first control signal to the IC 310, included in the camera module 180. The first control signal may include a clock request signal. The IC 310 may include the clock generation circuit for generating the clock signal, and the first control signal may be transmitted to the clock generation circuit within the IC 310.

In operation 805, the IC 310 may generate the clock signal based on the first control signal. The IC 310 may include the clock generation circuit and generate the clock signal through the clock generation circuit. The clock signal may include a reference signal causing driving of the IC 310 or the image sensor 230.

In operation 807, the IC 310 may provide (or transmit) the clock signal to the image sensor 230. The IC 310 may provide the clock signal to the image sensor 230 in response to generation of the clock signal. The IC 310 may transmit the clock signal to the image sensor 230 in order to drive the image sensor 230.

In operation 809, the processor 120 may transmit the second control signal to the image sensor 230. The second control signal may include a signal (for example, a camera driving signal) causing driving of the camera module 180. The image sensor 230 may acquire (or generate) data on the intensity of light or image data in response to transmission of the second control signal.

In operation 811, the processor 120 may acquire image data. The processor 120 may acquire image data through the image sensor 320 in response to transmission of the second control signal to the image sensor 320. The image data may include information indicating the intensity of light. According to various embodiments, the processor 120 may acquire the image data based on information related to the image data, acquired through the IC 310 and information indicating the intensity of light, acquired through the image sensor.

Figure 9:
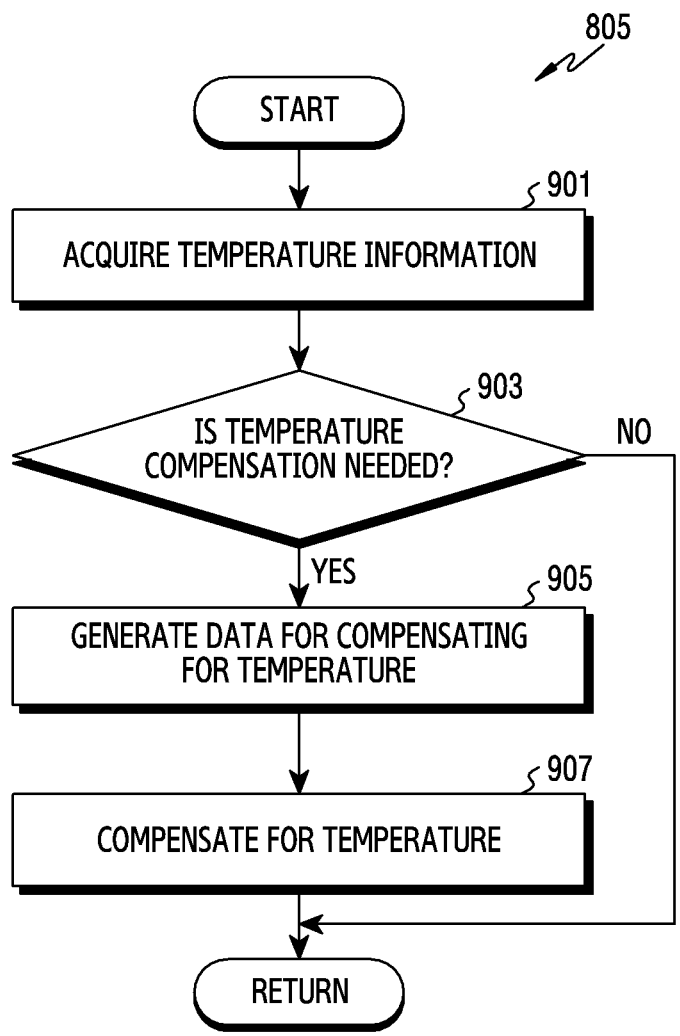
FIG. 9 is a flowchart illustrating an example of the operation of the electronic device related to temperature compensation according to various embodiments.

FIG. 9 is a flowchart illustrating an example of the operation of the electronic device related to temperature compensation according to various embodiments. FIG. 9 illustrates operation 805 of FIG. 8 in greater detail. FIG. 9 may, for example, illustrate the operation in the case in which temperature compensation is applied to a process of generating the clock signal.

Referring to FIG. 9, the processor 120 may acquire temperature information in operation 901. The processor 120 may acquire temperature information related to at least a part of the electronic device 101 through a temperature compensation circuit (for example, a temperature sensor). According to an embodiment, the processor 120 may identify temperature of the camera module 180 (or temperature related to the clock signal) based on temperature information acquired through the temperature compensation circuit.

In operation 903, the processor 120 may determine whether the temperature compensation is needed. The processor 120 may determine whether the temperature compensation is needed based on temperature information of at least a part of the electronic device 101. For example, when temperature of the camera module 180 is higher than or equal to predetermined temperature, the processor 120 may determine that the temperature compensation is needed. If temperature compensation is not required ('No' in operation 903), the operation may skip to the end of the routine.

According to various embodiments, a signal for the operation of the electronic device 101 may be distorted by a temperature change (for example, temperature rise). The electronic device 101 may have an error by the distorted signal. In order to minimize distortion by the temperature change, the electronic device 101 may perform temperature compensation. When the temperature rises higher than predetermined temperature, the temperature compensation may include a processing process for minimizing an influence by the rising temperature. For example, when there is frequency drift by the rising temperature, the temperature compensation may include an operation for fixing the frequency by generating a compensation voltage.

In operation 905 ('Yes' of operation 903), the processor 120 may generate data for compensating for temperature. According to various embodiments, the processor 120 may generate data for compensating for temperature in response to determination that temperature compensation is needed. Data for compensating for temperature may include information on a change, generated by the temperature change. For example, the information on the change may include information on distortion of the clock signal or information on a compensation value for compensating for distortion when the clock signal is distorted by the temperature change. The compensation value may include, for example, the compensation voltage.

In operation 907, the processor 120 may compensate for temperature. The processor 120 may perform processing for compensating for temperature based on data for compensating for temperature. The processor 120 may generate the compensation value based on data for compensating for temperature and stabilize the clock signal by providing the generated compensation value to the clock generation circuit. The compensation value may include, for example, the compensation voltage for stabilizing the clock signal. The processor 120 may fix a frequency by frequency drift and stabilize the same as a fixed frequency by providing the compensation voltage.

Although not illustrated, the processor 120 may transmit data for compensating for temperature to the IC 310 according to various embodiments. The IC 310 may receive data for compensating for temperature. The IC 310 may correct the clock signal in response to the reception. The corrected clock signal may be a clock signal, corrected to be stabilized based on the compensation value related to temperature.

Methods according to embodiments stated in claims and/or specifications of the present disclosure may be implemented in hardware, software, firmware or any combinations thereof.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined, for example, in the appended claims and/or disclosed herein.

In the above-described example embodiments of the present disclosure, a component included in the present disclosure is expressed in the singular or the plural according to a presented example embodiment. However, the singular form or plural form is selected for convenience of description suitable for the presented situation, and various example embodiments of the present disclosure are not limited to a single element or multiple elements thereof. Further, either multiple elements expressed in the description may be configured into a single element or a single element in the description may be configured into multiple elements.

The embodiments of the present disclosure disclosed herein and shown in the drawings are merely examples presented in order to easily describe technical details of the present disclosure and to aid in the understanding of the present disclosure, and are not intended to limit the scope of the present disclosure. Therefore, it should be understood that, in addition to the embodiments disclosed herein, all modifications and changes or modified and changed forms derived from the technical idea of the present disclosure fall within the scope of the present disclosure.

What is claimed is:

1. A camera module comprising:
a clock generation circuit;
a temperature sensor;
an optical correction circuit; and
an image sensor,
wherein the clock generation circuit is configured to:
receive a control signal for making a request for generating a clock signal,
in response to the control signal, generate the clock signal, wherein the clock signal is distinguished from the control signal, and
provide the clock signal to the optical correction circuit and the image sensor,
wherein the optical correction circuit is configured to be driven based on the clock signal, wherein the image sensor is configured to be driven in a state in which the image sensor is synchronized with the optical correction circuit, based on the clock signal, and wherein the camera module is configured to correct the clock signal based on temperature detected through the temperature sensor.

2. The camera module of claim 1, wherein the clock generation circuit is included within the optical correction circuit.

3. The camera module of claim 1, wherein the camera module further comprises a gyro circuit and the gyro circuit is configured to be driven while being synchronized with the optical correction circuit and the image sensor, based on the clock signal.

4. An electronic device comprising:
a temperature sensor;
a processor; and
a camera module,
wherein the camera module comprises:
   a clock generation circuit configured to:
      receive a control signal for making a request for generating a clock signal, and
      in response to the control signal, generate the clock signal;
   an optical correction circuit configured to be driven based on the clock signal; and
   an image sensor configured to be driven while being synchronized with the optical correction circuit, based on the clock signal,
wherein the processor is configured to:
   transfer the control signal to the clock generation circuit,
   transfer a control command to the camera module based on an input for driving the camera module, and
   acquire at least one image through the synchronized optical correction circuit and image sensor, based on the clock signal, and
wherein the electronic device is configured to correct the clock signal based on temperature detected through the temperature sensor.

5. The electronic device of claim 4, wherein the clock generation circuit is included within the optical correction circuit.

6. The electronic device of claim 4, further comprising a gyro circuit, wherein the gyro circuit is configured to be driven while being synchronized with the optical correction circuit and the image sensor based on the clock signal.

7. An electronic device comprising:
a camera module comprising an image sensor and a circuit related to acquisition of an image; and
a processor, functionally connected to the camera module,
wherein the processor is configured to transmit a first control signal to the circuit in response to detection of an event for driving the camera module,
the circuit is configured to generate a clock signal based at least on the first control signal received from the processor, and to provide the generated clock signal to the image sensor,
the image sensor is configured to acquire data for generating an image based on the clock signal and in response to reception of a second control signal from the processor, and to provide the acquired data to the processor; and
wherein the electronic device is configured to use the first control signal to make a request for generating the clock signal and to use the second control signal to make a request for acquiring the data to the image sensor.

8. The electronic device of claim 7, wherein the processor is configured to operate based on another clock signal, wherein the another clock signal is distinguished from the clock signal.

9. The electronic device of claim 7, wherein the electronic device is configured to use the clock signal to synchronize an operation of the circuit included within the camera module and an operation of the image sensor included within the camera module.

10. The electronic device of claim 7, wherein the circuit comprises a circuit for compensating a value of the data due to movement of the electronic device.

11. The electronic device of claim 7, wherein the circuit comprises an optical correction circuit.

12. The electronic device of claim 7, wherein the image sensor comprises a circuit configured to compensate for temperature and the circuit configured to compensate for the temperature is configured to acquire information on temperature of the camera module and to generate data related to the temperature of the camera module based on the acquired information.

13. The electronic device of claim 12, wherein the processor is configured to determine whether the temperature of the camera module is greater than or equal to predetermined temperature based on the acquired information, to generate data for compensating for the temperature of the camera module when the temperature of the camera module is greater than or equal to the predetermined temperature, and to correct the clock signal through the circuit based on the generated data.

14. The electronic device of claim 7, wherein the image sensor is configured to acquire information related to acquisition of image data from the circuit operating based on the clock signal and to acquire the data based on the acquired information.

15. The electronic device of claim 7, wherein the circuit further comprises a gyro circuit comprising a circuit for compensating for temperature and the processor is configured to acquire information on the temperature of the camera module through the gyro circuit.

16. The electronic device of claim 15, wherein the processor is configured to determine whether the temperature of the camera module is greater than or equal to predetermined temperature based on the acquired information, to generate data for compensating for the temperature of the camera module when the temperature of the camera module is greater than or equal to the predetermined temperature, and to correct the clock signal through the circuit based on the generated data.

17. An electronic device comprising:
a camera module comprising an image sensor and a circuit related to acquisition of an image; and
a processor, functionally connected to the camera module,
wherein the processor is configured to transmit a first control signal to the circuit in response to detection of an event for driving the camera module,
the circuit is configured to generate a clock signal based at least on the first control signal received from the processor, and to provide the generated clock signal to the image sensor,
the image sensor is configured to acquire data for generating an image based on the clock signal and in response to reception of a second control signal from the processor, and to provide the acquired data to the processor; and wherein the first control signal and/or the second control signal is transmitted from the processor to the camera module through an Inter Integrated Circuit (I2C) port.

18. The electronic device of claim 17, wherein the electronic device is configured to use the first control signal to make a request for generating the clock signal and to use the second control signal to make a request for acquiring the data to the image sensor.

* * * * *